United States Patent [19]

Fridman et al.

[11] 3,751,294

[45] Aug. 7, 1973

[54] BRUSHES FOR ELECTRICAL APPARATUS AND METHODS FOR THEIR MANUFACTURE

[76] Inventors: Georgy Nikolaevich Fridman, Leninsky prospekt, 67, kv. 40; Abram Samuilovich Fialkov, Kutuzovsky prospekt, 17, kv. 95; Yakov Gilievich Davidovich, prospekt Mira, 190a, korp. 9, kv. 46; Irina Dmitrievna Ivanova, Polyarnaya ul., 6a, kv. 10, all of Moscow; Ljudmila Petrovna Sysoeva, Sadovy per., 3kv. 17, Elektrougli; Abram Yakovlevich Gluskin, ul. Scherbakovskaya, 58, kv. 18, Moscow; Rimm Zigangirovich Galiskarov, Rostokinsky proezd, 2/26, kv. 4, Moscow; Esfir Lvovna Liberman, Volgogradsky prosp., 10, kv. 17, Moscow; Vera Stepanovna Pomortseva, Svobodny prosp., 4, kv. 25, Moscow, all of U.S.S.R.

[22] Filed: June 9, 1971

[21] Appl. No.: 151,432

Related U.S. Application Data

[63] Continuation-in-part of Ser. No. 749,390, Aug. 1, 1968, abandoned.

[52] U.S. Cl................ 117/226, 117/228, 117/168, 252/502, 252/511, 310/228, 310/251, 310/253
[51] Int. Cl.............................................. B44d 1/02
[58] Field of Search.................. 117/228, 168, 226; 252/503, 506, 511; 310/228, 251, 253

[56] References Cited

UNITED STATES PATENTS

| | | | |
|---|---|---|---|
| 2,859,139 | 11/1958 | Ramadanoff | 117/228 |
| 2,783,405 | 2/1957 | Atkins et al. | 310/228 |
| 2,445,003 | 7/1948 | Ramadanoff | 252/503 |
| 2,881,100 | 4/1959 | Hardman | 117/228 |
| 2,559,077 | 7/1951 | Johnson et al. | 252/511 X |

*Primary Examiner*—Edward G. Whitby
*Attorney*—Eric H. Waters, John G. Schwartz et al.

[57] ABSTRACT

This invention relates to brushes for electrical apparatus and to methods for manufacturing same.

Carbon and electrographitized brushes for electrical apparatus include, according to the invention, finely divided abrasive additions uniformly distributed throughout the whole volume of the brushes, mainly, in the form of silicon dioxide, and film-forming organic polymers, such as cobalt linoleate or polyimide resins, in a polymerized state.

The method for manufacturing said brushes consists in that brush blanks are subjected to combination treatment, for which purpose into the blanks are introduced uniformly throughout the whole volume thereof finely divided abrasive additions, mainly, in the form of silicon dioxide, whereupon the brush blanks are impregnated with solutions of film-forming organic polymers with subsequent thermal treatment until full polymerization of the impregnating composition.

4 Claims, 1 Drawing Figure

United States Patent [19]
Fridman et al.
[11] 3,751,294
[45] Aug. 7, 1973
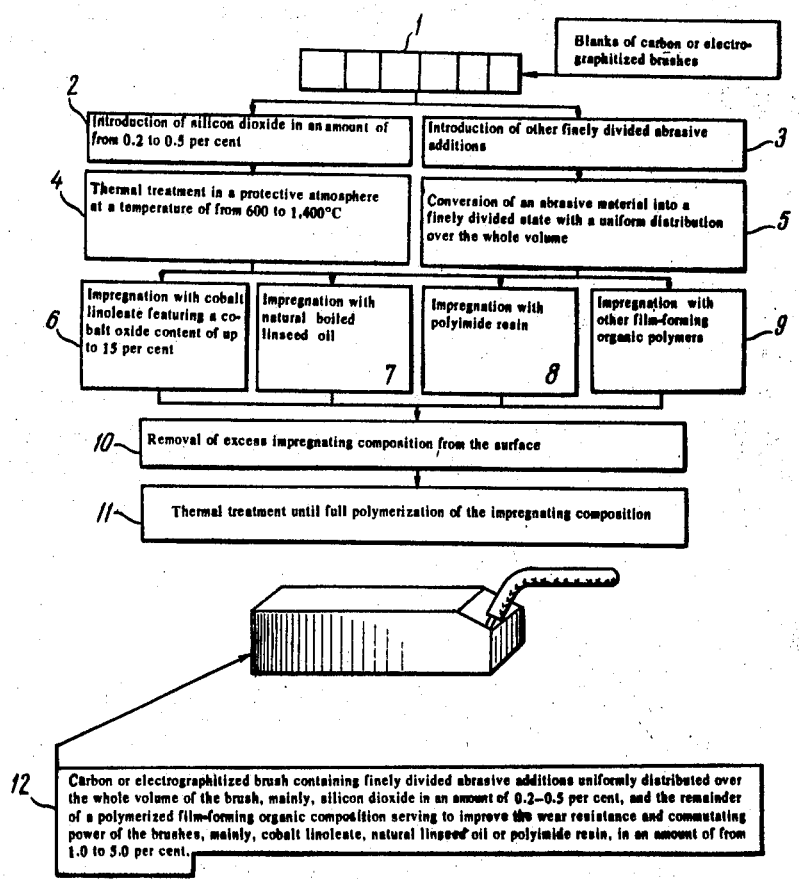

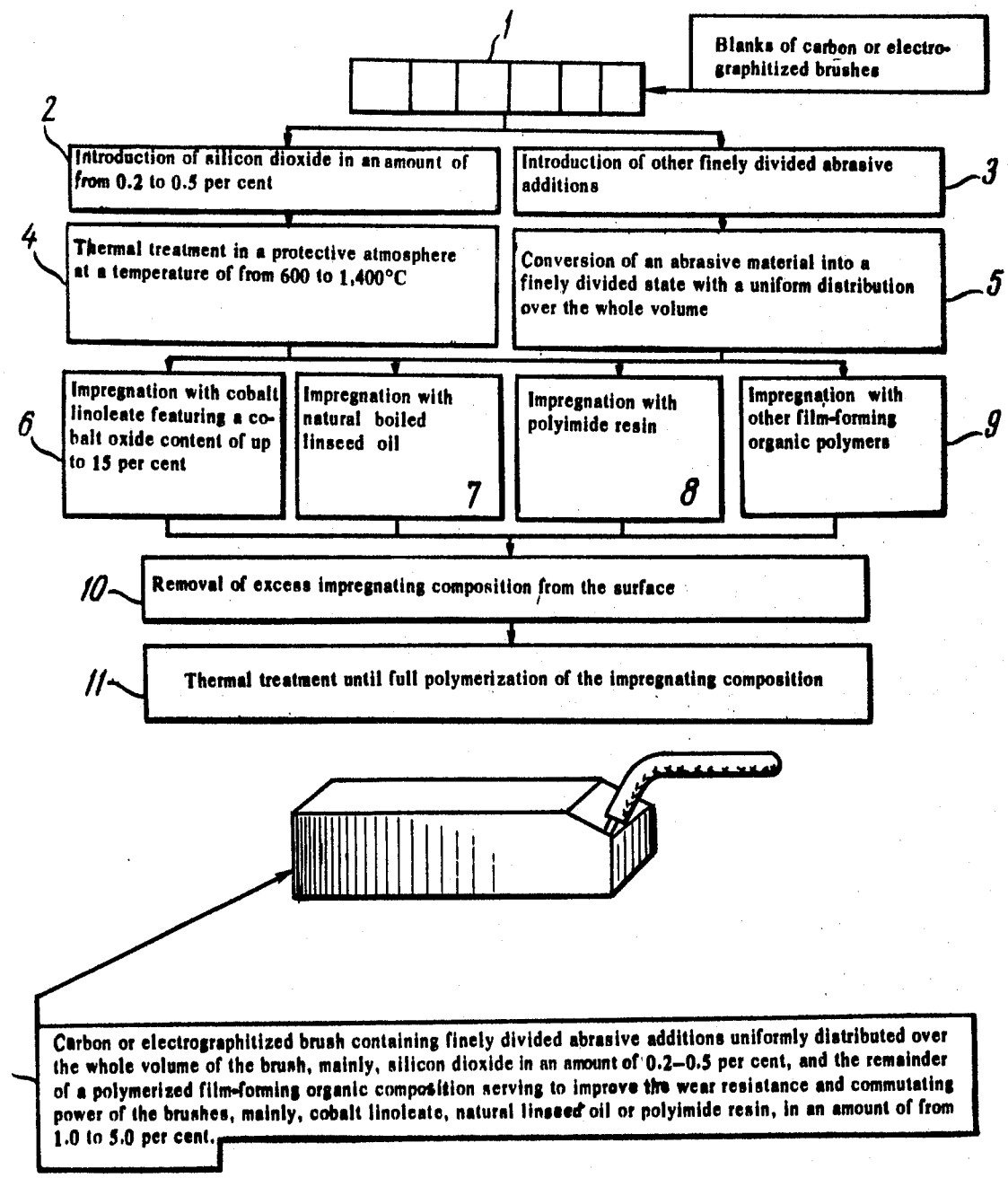

BRUSHES FOR ELECTRICAL APPARATUS AND METHODS FOR THEIR MANUFACTURE

REFERENCES

This application is a continuation-in-part of U.S. Pat. application Ser. No. 749,390, filed on Aug. 1, 1968, now abandoned.

INTRODUCTION

The present invention relates to heavy-current electrical engineering and, more particularly, it relates to carbon and electrographitized brushes featuring high wear resistance and commutating power and designed for use in electrical machines operating under stressed commutating conditions, capable of operation both in a normal atmosphere and in an atomsphere containing volatile organosilicon compounds, as well as to a method of manufacturing said brushes.

STATE OF ART

Attempts at increasing the reliability and prolonging the service life of the electrical apparatus under heavy operating conditions, with a simultaneous reduction of their weight, have brought about the development and use in electromechanical engineering of heat-resistant insulation comprising organosilicon polymers (silicones).

However, as shown by the practice of manufacturing such apparatus, the organosilicon insulation featuring a number of valuable properties, when heated in the course of operation, evolves volatile compounds which affet adversely the sliding contact, this resulting in the disruption of the commutation and a marked increase in the wear of the brushes, especially so in closed electrical apparatus.

The development of special types of electrical brushes presented one of the solutions to this problem. In particular, it has been found that copper-containing brushes do not react to the presence of silicon vapors in the atmosphere.

However, such brushes feature a considerably decreased contact resistance and, therefore, are only suitable for use in apparatus with more favorable commutating conditions.

For use under stressed commutating conditions, it has been proposed to use carbon and electrographitized brushes without additions of copper and other metals, however, containing up to 1 percent silicon dioxide.

However, the introduction of silicon dioxide into brushes, whose protective action is based on the principle of fine polishing of the collector contact surfaces, hampers the formation thereon of a high-quality polish, which brings about a deterioration of the mechanical and electrical characteristics of the sliding contact.

Thus, while the silicon dioxide content in the brushes increases, their wear resistance likewise increases and reaches the maximum when the weight of the silicon dioxide addition is about 0.8 percent.

However, as the silicon dioxide content in the brush increases, in the course of the required high-temperature treatment, especially in the temperature range of from 1,400° to 1,600°C, there occurs a reaction of the formation in the brush of silicon carbides which have an adverse effect on the contact surface of the collector in the course of the brush operation.

In order to avoid the formation of silicon carbides, the thermal treatment of the brushes is carried out in a protective atmosphere and the maximum temperature is brought down to 1,400°C; nevertheless, even in case said conditions are observed, the presence in the brush of more than 0.5 percent silicon dioxide, although making for a longer service life of the brushes, causes at the same time an increased wear of the collector plates.

For example, in the materials submitted to the 3rd Scientific U.S. Conference on Electric Insulation, held in Chicago in 1960, W.H.Fifer of the U.S. Bureau of Ship Building pointed out that, despite the progress made, in electrical apparatus featuring organosilicon insulation the reduction of the number of cases of insulation damages was counterbalanced by a certain increase in the brush wear. In units in which high resistance of major insulation should be maintained without inspection for a prolonged period of time no slight increase of the brush wear could be tolerated and, therefore, the use of any organo-silicon materials should be avoided.

There are known a number of impregnating compositions based on diverse organic materials and designed to improve the brush operation.

However, while increasing under normal conditions the wear resistance of the sliding contact, said compositions do not provide an adequately reliable operation of the brushes in an atmosphere containing silicon vapors.

For instance, one of the novel impregnating compounds based on diallyl phthalate and on allyl and diallyl alcohols, tested under normal conditions, made for the brush operation with a wear of no more than 0.3 mm per 100 hours, whereas in an atmosphere contaminated with silicon compounds the brushes tested on the same stands featured a wear of up to 0.5 mm per 100 hours, which means an increase of the wear by 1.67 times.

It is an object of the present invention to develop compositions and methods for manufacturing carbon and electrographitized brushes, that would make for an equally good operation of the brushes both in an atmosphere containing silicon vapors and under normal conditions, would cause no increased wear of the collectors and provide for a higher surface resistance of insulation of the electrical apparatus windings.

In the accomplishment of said object of the invention, in carbon and electrographitized brushes for electrical apparatus, according to the present invention, the material of the brushes contains finely divided abrasive conditions uniformly distributed throughout the whole volume thereof, mainly, in the form of silicon dioxide, and film-forming organic polymers, such as cobalt linoleate and polyimide resins, in a polymerized state, while the method of manufacturing the carbon and electrographitized brushes consists in that brush blanks are subjected to combination treatment, for which purpose there are introduced uniformly throughout the whole volume of the blanks finely divided abrasive additions, mainly, in the form of silicon dioxide, whereupon the brush blanks are impregnated with solutions of film-forming organic polymers with a subsequent thermal treatment until complete polymerization of the impregnating composition takes place.

The treatment of brushes provided by the present invention with said organic polymers incompatible with organosilicon polymers makes for imparting the following properties to the brushes.

1. Improvement of the sliding conditions of the brushes owing to the reduction of the friction coefficient and acceleration of the formation of a stable layer of polish on the collector.

2. Increased cementing of the brush material in the course of polymerization of the impregnating composition.

3. Reduction of the brush dust adhesion to the insulating surfaces inside the electrical apparatus.

4. Adequate thermal stability required to insure the preservation of properties imparted to the brush as a result of the combination treatment throughout the whole service life of the brush at the maximum permissible working temperatures.

The requirements set can be best met at prolonged temperatures of up to 150°C by organic film-forming compositions based on drying vegetable oils with the addition of metal oxides, that are capable of assuming current-conducting properties under the effect of electric current.

In the paint-and-varnish manufacture it has been well known to use vegetable oils with the addition of diverse siccatives such as metal oxides for a more rapid and complete drying.

For example, it has been known to use a combination siccative in the form of cobalt and lead naphthenates for the protection of carbon electrodes from destruction, which is well justified for the object set.

However, in accordance with the present invention, much better results are attained through the use of linoleates featuring an increased metal content, in particular, up to 15 percent cobalt oxide, as against the use of naphthenates.

Following the impregnation and thermal treatment, the remaining linoleate in the brush contains up to 30 percent oxygen, which has a favorable effect upon the formation on the collector of a stable layer of polish.

Of particular significance to the accomplishment of favorable resflts are both the choice of the impregnating composition and of correct concentration thereof for in the opposite case totally different properties may be attained. Thus, with an increase in the brush body after the polymerization of the amount of the impregnating composition left the commutating power of the brush features an initial marked increase whereupon it goes down rather rapidly and sparking occurs.

Prior to the beginning of sparking, the wear resistance increases monotonously.

Therefore, depending upon the operating conditions of the brushes, for each specific impregnating composition there exists a certain optimum value of its concentration in the brush, said optimum value being in the range of approximately 1.0 to 5.0 percent by weight of the brushes.

Also an essential distinguishing feature of the present invention is the impregnation with polyimide resins of the brushes designed for operation at temperatures of from 150° to 300°C.

The impregnation with these resins, in combination with abrasive additions, imparts valuable properties to the brushes analogous to those imparted as a result of impregnation with cobalt linoleate, however, unlike the latter, it also imparts to the brushes a high thermal stability owing to which the brushes can withstand prolonged working temperatures of up to 300°C and short-duration working temperatures of up to 400°–500°C.

For a better understanding of the present invention, several examples are presented hereinbelow with due reference to the accompanying drawing which illustrates diagrammatically the method of manufacturing brushes according to the invention, said examples being presented for the purpose of illustration and not by way of limitation.

EXAMPLE 1

Brushes for electrical apparatus with stressed commutating conditions, designed for operation in a normal atmosphere and in the presence of silicon vapors at a prolonged working temperature of the brushes up to 150°C.

Blanks of carbon and electrographitized brushes, in accordance with the appended drawing, are subjected to the following combination treatment.

The blanks are first dried at a temperature of 110°–120°C for 1.5–2 hours until a complete removal of moisture, whereupon they are cooled down to a temperature of 60°–70°C, at which temperature they are immersed, without the use of pressure or vacuum, in a bath containing polymethyl siloxane resin in a solution of toluene or ethyl Cellosolve.

The viscosity of the impregnating composition is selected depending upon the porosity of the brush blanks so that the increase in weight after the high-temperature treatment will be within the range of from 0.2 to 0.5 percent by weight of the blanks after moisture has been removed from the latter.

Thermal treatment is carried out in an argon or hydrogen atmosphere with a two- or three-stage temperature increase from 600° to 1,400°C, in the course of which finely divided silicon dioxide ($SiO_2$) is deposited uniformly throughout the whole volume of the blanks.

Secondary impregnation of the brush blanks, in accordance with the drawing, is carried out analogously with the initial one, but using cobalt linoleate obtained from linseed oil by the dry, fusion or deposition techniques, with the cobalt oxide content in the prepared linoleate of up to 15 percent by weight of the latter.

The impregnating composition is brought to working viscosity with the aid of wood turpentine preliminarily kept in the light in the open air for 1–2 days, with a view to obtaining after the subsequent secondary thermal treatment a gain in the weight of the brush blanks in the range of from two to five percent by weight after the primary thermal treatment.

The secondary thermal treatment, following the removal from the impregnated blanks of excess impregnating compound, is carried out in an atmosphere of air with a stepwise temperature increase of from 120° to 180°C until full polymerization of the impregnating composition.

The optimum content in the brushes of silicon dioxide and cobalt linoleate is determined for each new type of brushes from stand testings, in application to specific electrical apparatus.

EXAMPLE 2

Brushes for electrical apparatus with moderate commutating conditions, designed for operation in a normal atmosphere and in the presence of silicon vapors in said atmosphere, at a prolonged working temperature of the brushes up to 150°C.

The introduction into the brush blanks of abrasive additions does not differ from that described in Example 1.

The secondary impregnation in accordance with the drawing is effected analogously but with natural drying oil (boiled linseed oil) using a cobalt or some other siccative, dissolved to a working viscosity in wood turpentine, with a subseuqent thermal treatment as described in Example 1.

EXAMPLE 3

Brushes for electrical apparatus featuring prolonged working temperatures of from 150° to 300°C, designed for operation in a normal atmosphere and in the presence of silicon vapors in said atmosphere.

The primary impregnation and thermal treatment do not differ from those described in Examples 1 and 2.

The secondary impregnation, in accordance with the drawing, is effected with a solution of polyimide resin in dimethyl formamide, with a subsequent thermal treatment of the blanks at a smooth temperature increase of from 100° to 250°C, until complete polymerization of the impregnating composition.

As distinct from the preceding Examples, the impregnation with polyimide resin can be carried out in an autoclave, using vacuum and excessive pressure.

All variants of the brushes have been tested under laboratory conditions and in closed electrical apparatus with an output of from 1.0 to 9.000 kw, featuring organic and organosilicon insulation. The apparatus were tested on a stand under the hardest possible working conditions.

Presented hereinbelow by way of illustration are some characteristic data obtained from testing the most extensively used electrographitized types of brushes.

Table 1 contains the data on comparative tests of d.c. electrical apparatus with a collector peripheral speed of 20 m per sec., at an average current density in the brush of 10 amp. per sq.cm.

TABLE 1

Comparative testings of brushes in apparatus at a stand

| | | Quality of the brush operation Type of apparatus insulation | | | |
|---|---|---|---|---|---|
| | | organosilicon | | organic | |
| No. | Type of brush | wear, mm/1000 hr | commutation, conv. valve | wear, mm/1000 hr | commutation, conv. valve |
| 1. | Electrographitized brushes, no additional treatment | 15.5 | 4.0 | 3.0 | 10.0 |
| 2. | Variant 1, with the introduction of 0.8 per cent silicon dioxide | 2.0 | 8.0 | 2.0 | 8.0 |
| 3. | Variant 1, impregnated with cobalt linoleate (4 per cent gain in weight) | 4.5 | 7.0 | 2.0 | 10.0 |
| 4. | Variant 1, with the introduction of 0.5 per cent silicon dioxide and 4 per cent cobalt linoleate | 1.0 | 10.0 | 1.0 | 10.0 |
| 5. | Variant 1, with the introduction of 0.5 per cent silicon dioxide and 4.0 per cent boiled linseed oil | 1.3 | 8.0 | 1.3 | 8.0 |
| 6. | Variant 1, with the introduction of 0.5 per cent silicon dioxide and 2.0 per cent polyimide resin | 1.4 | 9.0 | 1.4 | 9.0 |

Note: The conventional value of commutation was found from the width of the zone of sparkless operation in per cent from the rated current of load, in accordance with the method of Prof. V.T.Kasyanov, by magnetization of additional poles.

Table 2 presents the results of comparative testings of the main variants according to Table 4 (Variants 1, 2 and 4) under actual working conditions, the brushes being used in closed high-speed electrical apparatus with stressed commutating conditions, with the collector peripheral speed of 50 m per sec., average current density under the brushes of 10 amp. per.sq.cm, specific pressure of the springs of 30 gram-force per sq.cm, and the collector working temperature of 120°C.

TABLE 2

Testing the brushes in operation in closed electrical apparatus with organosilicon insulation

| No. from Table 1 | Type of brush | Average service life, in mm/1,000 hr | Total resistance of current-conducting parts of the apparatus, in megohms | | |
|---|---|---|---|---|---|
| | | | initial | after 1,000 hr | after 2,000 hr |
| 1. | Electrographitized brushes, without additional treatment | 30.0 | 50.0 | 0.1 | 0.05 |
| 2. | Same, containing silicon dioxide | 4.0 | 50.0 | 5.0 | 4.0 |
| 3. | Containing 0.5 per cent silicon dioxide and 4.0 per cent cobalt linoleate | 2.5 | 50.0 | 25.0 | 20.0 |

Note: After cleaning the windings, the resistance of the apparatus insulation was restored to a value close to the initial one.

Laboratory investigations have also shown that the coefficient of friction of the brushes subjected to combination treatment is 1.4–1.6 times lower than that of the brushes containing only silicon dioxide, which makes for the reduction of mecanical friction losses during the sliding of the brushes on the collector and for an increase of the service life of the collector plates.

It is clear from the above-listed testing results that neither untreated brushes nor any of the aforedescribed ingredients introduced to the brush separately can fully solve the problem of normalizing the operation of the brush contact in an atomsphere containing silicon vapors.

The herein proposed treatment based on the effect of cumulative treatment with silicon dioxide and film-forming organic polymers helps fully eliminate the harmful effect of silicon vapors upon the sliding contact and makes for a rapid formation on the collector of a stable layer of polish acquiring a characteristic gloss. The brush dust from such brushes features reduced adhesion and adheres to the windings in a considerably lesser degree, which helps maintain the insulation resistance at a higher level in the course of operation, thus obviating the necessity of making regular stops for the purpose of cleaning the apparatus, even the high-voltage apparatus.

The wear resistance and commutating power of the brushes according to the present invention are in fact identical both in operation under normal atmospheric conditions and in the presence of silicon vapors in the atmosphere. Characteristics of the novel brushes proposed herein are superior to those of the brushes containing only silicon dioxide.

What is claimed is:

1. A method for manufacturing carbon and electrographitized brushes for electrical apparatus which comprises first impregnating a brush blank with a solution of an organosilicon resin in such an amount that after thermal treatment at 600° to 1400°C. the brush blank will contain, uniformly distributed over the entire volume thereof, finely divided silicon dioxide in an amount of 0.2 to 0.5 percent by weight of the blank, heating said impregnated blank at a temperature of 600° to 1400°C. until the blank contains said 0.2 to 0.5 percent be weight of finely divided silicon dioxide, secondly impregnating the blank with a solution of cobalt linoleate containing up to 15 percent by weight of cobalt oxide based on the weight of linoleate, in such an amount that after thermal treatment at 120° to 180°C. the secondly impregnated blank will contain 2.0 to 5.0 percent by weight of said second impregnating composition based on the weight of the blank, and heating said secondly impregnated blank to a temperature of 120° and 180°C. until complete polymerization of the second impregnating composition occurs.

2. A method for manufacturing carbon and electrographitized brushes for electrical apparatus which comprises distributing finely divided silicon dioxide throughout the entire volume of a brush blank, subsequently impregnating said blank with a solution of a film-forming organic polymer and subjecting said impregnated brush blank to thermal treatment until complete polymerization of the polymer is effected.

3. A method according to claim 2 wherein the thermal treatment takes place at 120° to 180°C. and the film forming polymer is natural boiled linseed oil in such an amount that after thermal treatment the blank will contain 2.0 to 5.0 percent by weight of polymerized linseed oil based on the weight of the blank.

4. A method according to claim 2 wherein the thermal treatment takes place at 100° to 250°C. and the film forming polymer is a polyimide resin in such an amount that after thermal treatment the blank will contain 1.0 to 4.0 percent by weight of polyimide resin based on the weight of the blank.

* * * * *